Figure 1:
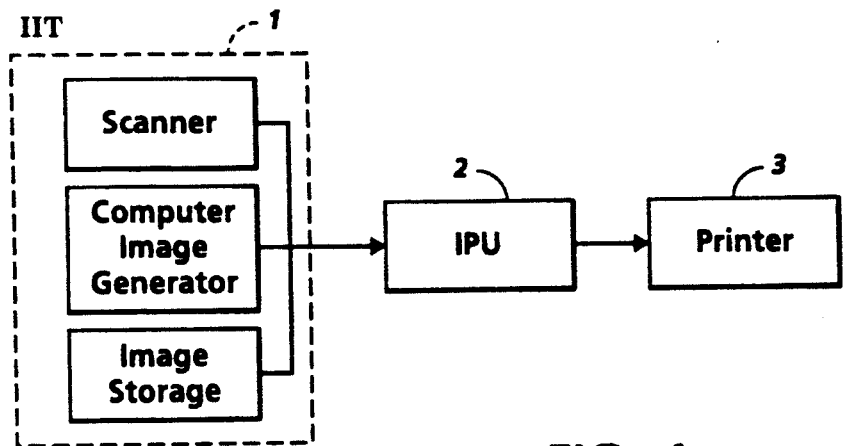

United States Patent [19]

Eschbach

[11] Patent Number: 5,325,211

[45] Date of Patent: Jun. 28, 1994

[54] ERROR DIFFUSION WITH OUTPUT AND INPUT BASED FEEDBACK

[75] Inventor: Reiner Eschbach, Webster, N.Y.

[73] Assignee: Xerox Corporation, Stamford, Conn.

[21] Appl. No.: 166

[22] Filed: Jan. 4, 1993

[51] Int. Cl.$^5$ ............................................. H04N 1/40
[52] U.S. Cl. ................................... 358/466; 358/447; 358/455; 358/448; 382/50
[58] Field of Search ............... 358/447, 455, 456, 466, 358/448, 443, 462, 445, 468, 467, 444, 453; 382/50, 54; 355/214

[56] References Cited

U.S. PATENT DOCUMENTS

| | | | |
|---|---|---|---|
| 4,051,536 | 9/1977 | Roetling | 358/298 |
| 4,149,194 | 4/1979 | Holladay | 358/460 |
| 4,256,401 | 3/1981 | Fujimura et al. | 355/214 |
| 4,339,774 | 7/1982 | Temple | 358/456 |
| 4,625,222 | 11/1986 | Bassetti et al. | 346/160 |
| 4,633,327 | 12/1986 | Roetling | 358/456 |
| 4,654,721 | 3/1987 | Goertzel et al. | 358/459 |
| 4,672,463 | 6/1987 | Tomohisa et al. | 358/447 |
| 4,693,593 | 9/1987 | Gerger | 355/214 |
| 4,700,229 | 10/1987 | Herrmann et al. | 358/166 |
| 4,709,250 | 11/1987 | Takeuchi | 346/160 |
| 4,724,461 | 2/1988 | Rushing | 355/214 |
| 4,924,322 | 5/1990 | Kurosawa et al. | 358/448 |
| 4,955,065 | 9/1990 | Ulichney | 382/50 |
| 5,008,950 | 4/1991 | Katayama et al. | 358/447 |
| 5,045,952 | 9/1991 | Eschbach | 358/447 |
| 5,055,942 | 10/1991 | Levien | 358/456 |
| 5,077,812 | 12/1991 | Kanno et al. | 358/466 |
| 5,130,823 | 7/1992 | Bowers | 358/466 |
| 5,208,871 | 5/1993 | Eschbach | 358/466 |
| 5,245,678 | 9/1993 | Eschbach et al. | 358/466 |

OTHER PUBLICATIONS

P. Roetling, "Halftone Method with Edge Enhancement and Moire Supression", J. Opt. Soc. Amer. vol. 66, No. 10, Oct. 1976, pp. 985-986.

Floyd and Steinberg, "An Adaptive Algorithm for Spatial Greyscale", Proceedings of the SID 17/2, 75-77, (1976).

Jarvis et al., "A Survey of Techniques for the Display of Continuous Tone Pictures on Bilevel Displays", Computer Graphics and Image Processing, vol. 5, pp. 13-40, (1976).

Stucki, "MECCA-A Multiple-Error Correction Computation Algorithm for Bi-Level Image Hardcopy Reproduction", IBM Res. Rep. RZ1060, (1981).

Goertzel et al., "Digital Halftoning in the IBM 4250 Printer", IBM J. Res. Develop. vol. 31, No. 1, Jan. 1987.

Primary Examiner—Stephen Brinich
Assistant Examiner—Fan Lee
Attorney, Agent, or Firm—Mark Costello

[57] ABSTRACT

A method of quantizing pixels in an image formed by a plurality of pixels, each pixel representing an optical density of the image at a location therewith, and having an original optical density value selected from one of a set of 'c' original optical density values that has a number of members larger than a desired output set of 'd' optical density values, through a process of error diffusion. In this process, 'c' and 'd' are integer values representing pixel depth. For an input image so comprised, initially, an image signal is initially modified in accordance with previously determined error. Thereafter, during the quantization step of the process, the threshold of an error diffusion process is dynamically adjusted in accordance with the original image to selectively control an amount of edge enhancement introduced into the image. The threshold level is selectively modified on a pixel by pixel basis and may be used to increase or decrease the edge enhancement of the output digital image, thus, more closely representing the original detail and edge sharpness of the continuous tone input image. The threshold of the error diffusion process is also varied responsive to the image that is output, by providing a feedback response to the thresholding process, to vary the threshold level to favor a determination of an output pixel having the same state as an adjacent pixel. Based on the dynamically varying threshold, an output pixel is determined, and the error or difference between the output and the modified image signal is determined. This error is added on a weighted basis to a predetermined group of neighboring image signals, in accordance with the image signal modification initially described.

17 Claims, 2 Drawing Sheets

ERROR DIFFUSION WITH OUTPUT AND INPUT BASED FEEDBACK

This invention relates to error diffusion scheme in which the quantization process is varied in accordance with the input image and the output image.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printed. Besides gray level information derived by scanning, certain processing techniques such as those described, for example, in U.S. patent application Ser. No. 07/600,542 entitled "Method for Image Conversions With Error Diffusion", by R. Eschbach, produce gray level pixel values which require conversion to a limited set of "legal" or output values.

One standard method of converting gray level pixel values to binary level pixel values is through the use of dithering or halftoning processes. In such arrangements, over a given area having a number of gray pixels therein, each pixel value of an array of gray level pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. Dithering or halftoning presents problems, however, in that the amount of gray within an original image is not maintained exactly over an area, because the finite number of elements inside each dither matrix—and therefore halftone cell—only allows the reproduction of a finite number of gray levels, i.e. number of elements in the cell plus one, or less. The error arising from the difference between the output pixel value and the actual gray level pixel value at any particular cell is simply thrown away. This results in a loss of image information. In particular, dithering introduces coarse quantization artifacts which are visible in the image areas where the scene has little variation. This is also known as "banding", and is caused by the limited number of output gray levels available. The "banding" artifacts generally increase with decreasing cell size, which is identical to a decrease in the number of levels that can be represented by the halftone cell.

In the ARIES (Alias Reduction and Image Enhancement System) method of halftone reproduction, described by P. Roetling in "Halftone Method With Edge Enhancement and Moire' Suppression," J. Opt. Soc. Amer. Vol. 66, No. 10, pp. 985-989, October, 1976, image information initially has a set of halftone screen values for a cell added to the information. A uniform threshold value is applied to the screened information, to produce an output value. The average gray value over the cell area of the input image is compared to the average gray value over the cell area of the output image. See, also, U.S. Pat. No. 4,051,536 to Roetling and U.S. Pat. No. 4,633,327 to Roetling. In this way, the error between original and output is minimized over each halftone cell. The banding artifact, however, is not reduced.

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75-77 (1976) (hereinafter, "Floyd and Steinberg"). Another, more elaborate method would be the error diffusion techniques of U.S. Pat. No. 5,045,952 to Eschbach, assigned to the same assignee as the present invention; which serves to provide image dependent edge enhancement. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13-40 (1976) (hereinafter, Jarvis), and in "MECCA—A Multiple-Error Correction Computation Algorithm for Bi-Level Image Hardcopy Reproduction" by Stucki, IBM Res. Rep. RZ1060 (1981) (hereinafter, Stucki). Modifications of the error calculation and weight allocation have been taught, for example, in U.S. patent application Ser. No. 07/672,987, entitled "Method for Image Conversion with Application of Multiple Error Diffusion Matrices", by Eschbach, U.S. Pat. No. 4,924,322 to Kurosawa et. al., U.S. Pat. No. 4,339,774 to Temple, and U.S. Pat. No. 4,955,065, to Ulichney.

Error diffusion attempts to maintain image density by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. A problem noted with the use of the standard error diffusion algorithms for printing applications is the production of large numbers of isolated black and/or white pixels which are difficult to reproduce with many types of printers, including electrophotographic printers. An error diffusion method on halftone cell basis to overcome the printability problem is taught by U.S. Pat. No. 4,654,721 to Goertzel, where a method is shown to convert a continuous tone image to a bilevel pixel image. The total error generated in one halftone cell is distributed to a predetermined number of adjacent halftone cells. In this way, printable images are generated, while the banding artifact is reduced, by alternating between fixed output cell patterns. Because of an inherent lack of partial dots in this process, evidenced as a loss in sharpness, edge detection and sharpening was included. See, also, "Digital Halftoning in the IBM 4250 Printer" by Goertzel et al. (Goertzel), IBM J. Res. Develop., Vol 31, No. 1, January, 1987. U.S. patent application Ser. No. 07/583,337 to Shiau, and Ser. No. 07/775,201 to Fan, teach the use of similar methods to reduce a continuous tone image to a multilevel pixel image with diffusion of error between adjacent halftone cells. These methods, however, do not determine a best fit halftone dot as done in the ARIES method.

U.S. patent application Ser. No. 07/800,811 by Eschbach describes an error diffusion method that operates on a pixel basis where the threshold of the error diffusion process is modified in order to obtain printable patterns that resemble halftone cells by generating regular dot placements.

"MECCA—A Multiple-Error Correction Computation Algorithm for Bi-Level Image Hardcopy Reproduction" by Stucki, IBM Res. Rep. RZ1060 (1981), also describes an error diffusion algorithm incorporating actual printer dot overlaps in the error calculation, thereby generating a better printable result.

U.S. Pat. No. 5,055,943 to Levien suggests another pixel based error diffusion scheme where the tendency of the individual dots to form clusters in a screened image can be varied by applying a hysteresis constant and recursion techniques known from adaptive screening, to allow adjustment of image coarseness by adjustment of the hysteresis constant. This method produces better images, particularly for electrophotographic printing than the original error diffusion algorithm, but the images tend to have reduced sharpness or detail resolution, as compared to Floyd and Steinberg. In implementation, the Levien method uses an error diffusion process, providing a feedback response based on the output image, and particularly, dot size. The resulting irregular placement of dots improves the number of gray shades which can be reproduced. However, the hysteresis function implemented to control the feedback response tends to dampen the response at edges.

For example, U.S. Pat. No. 4,625,222 to Bassetti et al. discloses a print enhancement control system for an electrostatic copying machine wherein control logic circuitry processes a set of image altering parameters to improve image production quality. These parameters, whose values are either predetermined, fixed or have been received from an exterior source, improve image quality (i.e., resolution) by modifying modulated gray signals.

U.S. Pat. No. 4,700,229 to Herrmann et al. discloses an image enhancement circuit which converts a low quality image signal into a high quality image signal by modifying the binary representation of a picture. Image enhancement is accomplished by multiplying a series of error difference signals by a series of weighting factors k(i) which produce a clearer image by improving picture resolution.

U.S. Pat. No. 4,672,463 to Tomohisa et al. discloses a method to improve image quality within an electrostatic reproduction machine wherein the sharpness of an image is improved based on the value of an image sharpness control parameter that has been calculated examining the copy quality of an original.

U.S. Pat. No. 4,709,250 to Takeuchi discloses an image forming apparatus which improves the halftone image quality of an original. The pulse width of a reference control signal controls and improves image quality in response to a detected image density signal.

U.S. Pat. No. 4,724,461 to Rushing discloses an image improving process control for an electrostatic copying machine which maintains high image quality by adjusting a set of process control parameters.

U.S. Pat. No. 4,256,401 to Fujimura et al. discloses an image density adjustment method wherein a predetermined image density level within an electrostatic copying machine is maintained at a standard density by varying a set of input control parameters.

U.S. Pat. No. 4,693,593 to Gerger discloses a method of improving the image quality by controlling a single process parameter in response to changes in sensitometric characteristics.

All of the references cited herein are incorporated by reference for their teachings.

SUMMARY OF THE INVENTION

In accordance with the invention, there is provided a method for quantizing gray level pixels using a combination of error diffusion methods, in which the printability of the output on xerographic engines is increased, while edges within the image are enhanced.

In accordance with one aspect of the invention, there is provided a method of quantizing pixels in an image formed by a plurality of pixels, each pixel representing an optical density of the image at a location therewith, and having an original optical density value selected from one of a set of 'c' original optical density values that has a number of members larger than a desired output set of 'd' optical density values, through a process of error diffusion. In this process, 'c' and 'd' are integer values representing pixel depth. For an input image so comprised, initially, an image signal is initially modified in accordance with previously determined error. Thereafter, during the quantization step of the process, the threshold of an error diffusion process is dynamically adjusted in accordance with the original image to selectively control an amount of edge enhancement introduced into the image. The threshold level is selectively modified on a pixel by pixel basis and may be used to increase or decrease the edge enhancement of the output digital image, thus, more closely representing the original detail and edge sharpness of the continuous tone input image. The threshold of the error diffusion process is also varied responsive to the image that is output, by providing a feedback response to the thresholding process, to vary the threshold level to favor a determination of an output pixel having the same state as an adjacent pixels. Based on the dynamically varying threshold, an output pixel is determined, and the error or difference between the output and the modified image signal is determined. This error is added on a weighted basis to a predetermined group of neighboring image signals, in accordance with the image signal modification initially described.

The described invention advantageously clusters individual dots to be printable by electrophotographic printing methods, inasmuch as the output feedback response described is essentially an improvement on the method described by U.S. Pat. No. 5,055,942 to Levien. However, the present invention enhances edges by using the edge enhancing method described in U.S. Pat. No. 5,045,952 to Eschbach. Both methods are density preserving methods, which tend to maintain density within a given area in accordance with the original, and as such, are superior to other methods which might be used to sharpen or enhance edges, but operate without regard to maintaining density. However, as both use the common error diffusion process, they have a speed of operation significantly faster, and more economical than the use of the error diffusion method of Levien, preceded by an edge enhancing filter.

Figure 2:
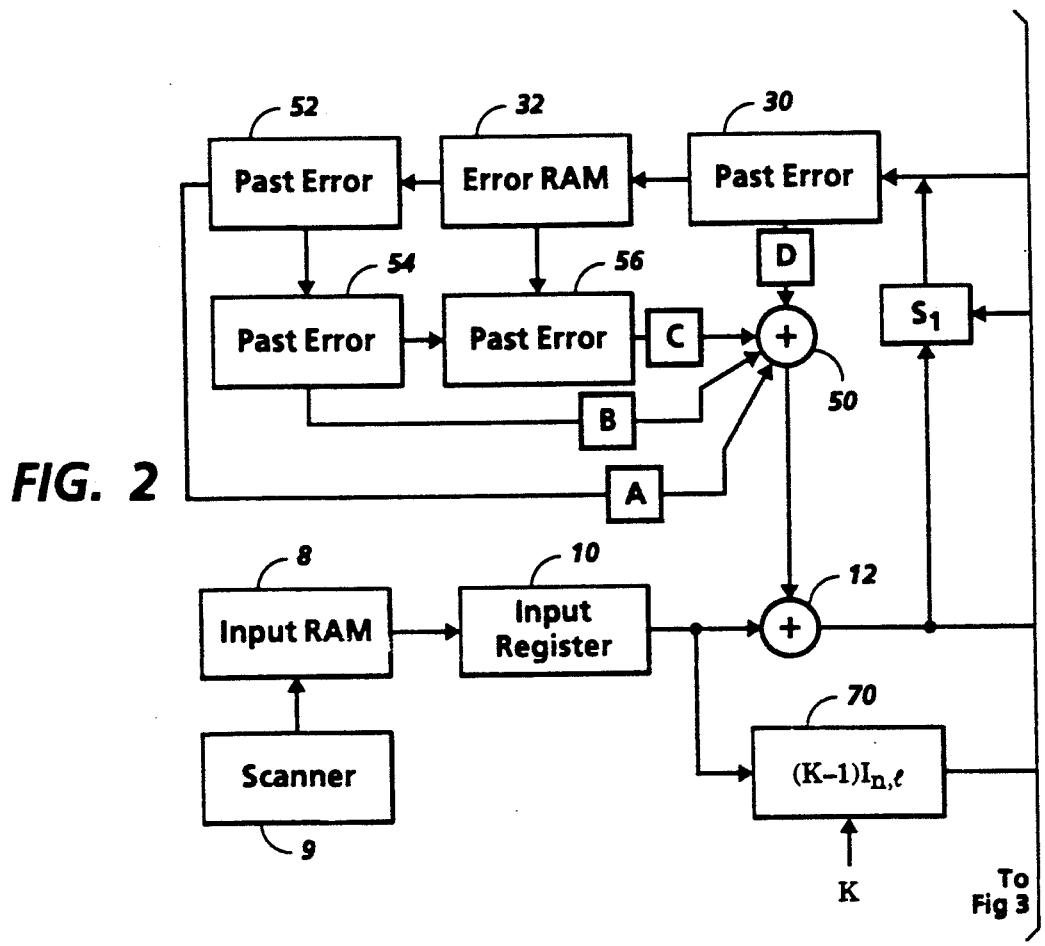
Figure 3:
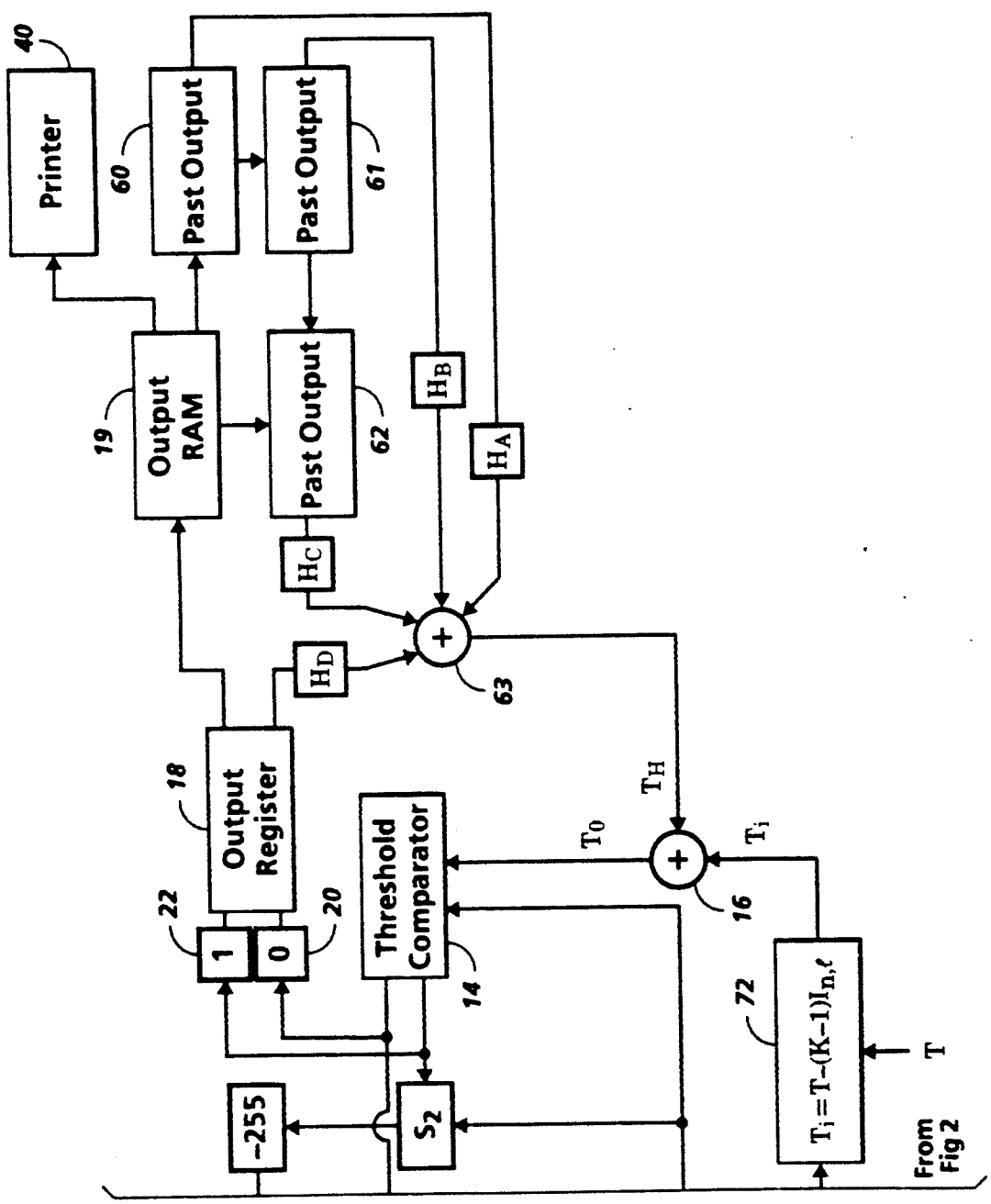

These and other aspects of the invention will become apparent from the following descriptions to illustrate a preferred embodiment of the invention read in conjunction with the accompanying drawings in which:

FIG. 1 is a a block diagram showing a system in which the present invention may find use; and FIGS. 2 and 3 show a block diagram of an embodiment of the present invention.

Referring now to the drawings where the showings are for the purpose of describing an embodiment of the invention and not for limiting same, a basic system for carrying out the present invention is shown in FIG. 1. In the present case, gray level image data from image input terminal (hereinafter, IIT) 1 may be characterized as image data, each pixel of which is defined at a single level or optical density in a set of 'c' optical density magnitudes or levels, the number of members in the set of levels being larger than desired. The number of desired levels is given by the capabilities of printer 3, or by system considerations. Each pixel from IIT 1 will be processed at image processing unit (hereinafter, IPU) 2 in the manner described hereinbelow, to redefine each pixel in terms of a new, smaller set of 'd' magnitudes or levels. In this process, 'c' and 'd' are integer values representing pixel depth representing the magnitude of density. Here, color data may be represented by a number of independent channels or separations which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer 14. Another case of this is the conversion of data from a relatively large set of color data expressed as red, green and blue, or cyan, magenta, yellow and black, to one of five legal bin values for printing on printer 14, as described in U.S. patent application Ser. No. 07/755,380, entitled "Method for Quantization of Gray Level Pixel Data with Application of Under Compensated Error Diffusion", by Eschbach et al.

An input image of the type to be processed as hereinafter described may be represented by a set of gray values (gray level pixels) arranged in an array of L lines, each line containing N gray values with depth b, with any one pixel in said array denoted by I(n,l). Gray values are typically expressed as integers, with one example falling in the range from 0 to 255, although greater or lesser number of levels, as well as non-integer representations, are possible. An output image is considered to consist of pixels, each pixel corresponding to an output element that is printed by a digital printer or display. Gray does not refer to a specific color herein, but to a gradation of optical density.

With reference to FIGS. 2 and 3, a stored array of input image signals at input RAM 8, which may be from any image, including scanned images from a scanner 9 such as the Xerox 7650 Pro Imager scanner operated in accordance with suitable driver software or computer generated representations, directs input image I into the system on a signal by signal basis, where n,l represents the position of a single image signal $I_{n,l}$ in a stream of image signals. Such a scanner produced gray level signals or pixels, generally defined as multi bit or N bit values, which defines $2^N$ possible levels of optical density. $I_{n,l}$ refers in this description to both the signal that is positioned at n,l in the image signal stream, and the optical intensity or density of the image signal at position n,l. Initially, a single signal $I_{n,l}$ is stored to input register 10 suitable for holding such a multi-bit signal. Each input signal has a corresponding error correction signal $\epsilon$ added to the image signal $I_{n,l}$ at adder 12, where $\epsilon_{n,l}$ is a sum of weighted error term signals of previous pixels to be added to $I_{n,l}$ resulting in a modified image signal. The modified image signal, the sum of the input image signal and the error correction signal of previous pixels ($I_{n,l}+\epsilon_{n,l}$), is passed to threshold comparator 14, where it is compared to the threshold generated at adder 16 to determine the corresponding output state $s_i$, where the drawing shows the case for two output states $s_1$ and $s_2$ for simplicity, although more output levels are possible. At threshold comparator 14, $I_{n,l}+\epsilon_{n,l}$ is compared to the threshold signal $T_O$ composed of $T_i$ and $T_H$, the derivation of which will be discussed further hereinafter. At threshold comparator 14, the signal $I_{n,l}+\epsilon_{n,l}$ compared to a single reference signal $T_O$ to determine an appropriate output signal $B_{n,l}$ for pixel $I_{n,l}$ such as, for example, for a binary output printing system, a spot or no spot. Responsive to this comparison, if the signal $I_{n,l}+\epsilon_{n,l}$ is greater than the reference, then an image signal representing a single white spot is directed to output register 18 from RAM memory 20. If responsive to this comparison, signal $I_{n,l}+\epsilon_{n,l}$ is less than the reference, then an image signal representing a single black spot is directed to output register 18 from RAM memory 22. If a white pixel is directed to output register 18, switch $S_1$ is enabled to allow the modified input image signal $I_{n,l}+\epsilon_{n,l}$ to be stored to error register 30 without alteration. If a black pixel is directed to output register 18, switch $S_2$ is enabled to allow the modified input image signal $I_{n,l}+\epsilon_{n,l}$ to be stored to error register 30, after having a value equal to black (−255 in the 8 bit case) subtracted from the signal. Pixels stored to output register 18 are eventually directed to output RAM 19 as printer output signals required by the imaging application, for example, binary printer 40. In the present case, the printer can be any binary printer, for example the Xerox 4030 (simple, low speed printer) or the Xerox Docutech Model Production Printer 135 (a very complex, high speed printer).

Error determined in the quantization of pixels is stored at error RAM 32, until an image signal which requires the addition of error passes through the system. Then, the portion of the stored errors from previous quantization is directed to adder 50 from past error registers 52, 54, 56 and error register 30. Error registers 52, 54, 56 are connected to allow the error signal to be shifted from register to register as a line of data is directed through the described system. Error signals are directed through multipliers A, B, C and D, respectively, in accordance with Floyd and Steinberg type error diffusion, with a weighting scheme selected as desired. Note that the use of four error signals is for illustrative purposes only and that lesser or larger numbers might be used in the actual implementation.

Signal $T_O$ is input to threshold comparator 14 and is generated from the threshold signals $T_i$ which controls the image sharpness and $T_H$ which controls the pixels clustering for printability. To derive $T_H$, output signal $B_{n,l}$ stored at output register 18, is directed past output RAM 60. From there, the past output values are transferred into the past output registers 60, 61 and 62. Output register 18 and past output registers 60 through 62 are connected through multipliers $H_A$, $H_B$, $H_C$ and $H_D$ to adder 63 in order to generate the signal $T_H$ in a like manner of generating the error signal $\epsilon_{n,l}$. The subscript (n,l) has been omitted from all threshold signals for brevity.

To derive $T_i$, input image signal $I_{n,l}$ stored at input register 10, is directed to determination block 70, where image signal $I_{n,l}$ is multiplied by a factor $(K-1)$. The enhancement factor K may be held constant or may vary as a function of the input image content, local or global, within the continuous tone input image. Subsequently, the determined value $(K-1) I_{n,l}$ is subtracted from a reference value at difference determination 72 and added to the threshold signal $T_H$. Further discussion of the derivation of the value $T_i$ can be obtained by review of U.S. Pat. No. 5,045,952 to Eschbach, incorporated herein by reference.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A document processing system for preparing a document derived originally with a device describing each signal in terms of c levels, for printing at a printer responding to printers signals having d levels, while maintaining gray density with the image, comprising:
   a scanner, producing a set of input signals representing optical density at discrete points within a document, said input signals having magnitudes varying over c levels;
   means for adding to each input signal a fractional portion of an error signal of at least one previously processed input signal;
   means for comparing each modified input signal with at least one reference signal to determine which of d printer output signals best represents the modified input signal;
   a printer, responsive to said printer output signals reproduce the document in accordance therewith;
   means for determining the difference between the determined printer output signal and the modified input signal, and generating at least one error signal responsive indicative thereof;
   means for varying the reference signal as a function of the input signal and at least one previous printer output signal.

2. The device as defined in claim 1, wherein said input signals derived by said scanner are N-bit digital signals representing gray at a number of levels equal to $2^N$.

3. The device as defined in claim 1, wherein said printer output signals directed to said printer are one bit digital signals representing either black or white.

4. The device as defined in claim 1, wherein said means for varying the reference signal as a function of the input signal and at least one previous printer output signal includes:
   means for generating an input threshold signal;
   a plurality of registers storing printer output signals for previously processed input signals at preselected positions with respect to a current input signal;
   means for determining a weighted fraction of each the stored printer output signal;
   means for summing the weighted fractions of the stored printer output signals;
   means for adding the input threshold signal and the weighted sum of the stored printer output signals to derive the reference signal.

5. The device as defined in claim 1, wherein said means for determining the difference between the determined printer signal and the modified input signal, and generating at least one error signal responsive indicative thereof includes:
   means for deriving error signals representing the difference between the determined printer output signal and the modified input signal;
   a plurality of registers storing said error signals for previously processed input signals at preselected positions with respect to a current input signal;
   means for determining a weighted fraction of each of the stored error signals;
   means for summing the weighted fractions of the stored error signals;
   means for adding the sum of weighted fractions of the stored error signals to the input signal, prior to comparison with said reference signal.

6. A document processing system for preparing a document derived originally with a device describing each signal in terms of c levels, for display at a display responding to display signals having d levels, while maintaining gray density within the image, comprising:
   a scanner, producing a set of input signals representing optical density at discrete points within a document, said input signals having magnitudes varying over c levels;
   means for adding to each input signal a fractional portion of an error signal of at least one previously processed input signal;
   means for comparing each modified input signal with at least one reference signal to determine which of d display output signals best represents the modified input signal;
   a display, responsive to said display output signals to reproduce the document in accordance therewith;
   means for determining the difference between the determined display output signal and the modified input signal, and generating at least one error signal responsive indicative thereof;
   means for varying the reference signal as a function of the input signal and at least one previous display output signal.

7. The device as defined in claim 6, wherein said input signals derived by said scanner are N-bit digital signals representing gray at a number of levels equal to $2^N$.

8. The device as defined in claim 7, wherein said display output signals directed to said display are one bit digital signals representing either black or white.

9. The device as defined in claim 6, wherein said means for varying the reference signal as a function of the input signal and at least one previous display output signal includes:
   means for generating an input threshold signal;
   a plurality of registers storing display output signals for previously processed input signals at preselected positions with respect to a current input signal;

means for multiplying each stored display output signals by a predetermined hysteresis function;

means for summing the outputs of the multiplying means to derive an output based feedback signal;

means for adding the input threshold signal and the output based feedback signal to derive the reference signal.

10. The device as defined in claim 6, wherein said means for determining the difference between the determined display signal and the modified input signal, and generating at least one error signal responsive indicative thereof includes:

means for deriving error signals representing the difference between the determined display output signal and the modified input signal;

a plurality of registers storing said error signals for previously processed input signals at preselected positions with respect to a current input signal;

means for determining a weighted fraction of each of the stored error signals;

means for summing the weighted fractions of the stored error signals;

means for adding the sum of weighted fractions of the stored error signals to the input signal, prior to comparison with said reference signal.

11. A document processing system for preparing a document derived originally with a device describing each signal in terms of c levels, for printing at a printer responding to printer signals having d levels, while maintaining gray density with the image, comprising:

a computer workstation, operating in accordance with document production software, producing a set of input signals representing optical density at discrete points within a document, said input signals having magnitudes varying over c levels;

means for adding to each input signal a fractional portion of an error signal of at least one previously processed input signal;

means for comparing each modified input signal with at least one reference signal to determine which of d printer output signals best represents the modified input signal;

a printer, responsive to said printer output signals to reproduce the document in accordance therewith;

means for determining the difference between the determined printer output signal and the modified input signal, and generating at least one error signal responsive indicative thereof;

means for varying the reference signal as a function of the input signal and at least one previous printer output signal.

12. The device as defined in claim 11, wherein said input signals derived by said computer workstation are N-bit digital signals representing gray at a number of levels equal to $2^N$.

13. The device as defined in claim 12, wherein said printer output signals directed to said printer are one bit digital signals representing either black or white.

14. The device as defined in claim 11, wherein said means for varying the reference signal as a function of the input signal and at least one previous printer output signal includes:

means for generating an input threshold signal;

a plurality of registers storing printer output signals for previously processed input signals at prese-lected positions with respect to a current input signal;

means for multiplying each stored printer output signals by a predetermined hysteresis function;

means for summing the outputs of the multiplying means to derive an output based feedback signal;

means for adding the input threshold signal and the output based feedback signal to derive the reference signal.

15. The device as defined in claim 11, wherein said means for determining the difference between the determined printer output signal and the modified input signal, and generating at least one error signal responsive indicative thereof includes:

means for deriving error signals representing the difference between the determined printer output signal and the modified input signal;

a plurality of registers storing said error signals for previously processed input signals at preselected positions with respect to a current input signal;

means for determining a weighted fraction of each of the stored error signals;

means for summing the weighted fractions of the stored error signals;

means for adding the sum of weighted fractions of the stored error signals to the input signal, prior to comparison with said reference signal.

16. A method of quantizing pixels in an image formed by a plurality of pixels, each pixel representing an optical density of the image at a location therewithin as determined by an gray pixel producing device, and having an original optical density value selected from one of a set of 'c' original optical density values that has a number of members larger than a desired printer set of 'd' optical density values required of an output device, the steps including receiving an image signal from a said gray pixel producing devices;

modifying each gray pixel in accordance with previously determined local error;

setting a threshold level as a function of a current gray pixel and a number of previously pixels previously directed to said output device;

thresholding each gray pixel with the threshold level set, to derive black or white pixels, suitable to drive the output device;

determining a gray difference between the black or white output device driving pixels and the modified gray pixels, and generating an error signal representative of the gray difference;

storing said error signals, for subsequent formation of a local error and modification of the image signal modification.

17. A document processing system for preparing a document derived originally with a device describing each signal in terms of c levels, for printing at a printer responding to printer signals having d levels, while maintaining gray density with the image, comprising:

a scanner, producing a set of input signals representing optical density at discrete points within a document, said input signals having magnitudes varying over c levels;

means for adding to each input signal a fractional portion of an error signal of at least one previously processed input signal;

means for comparing each modified input signal with at least one reference signal to determine which of d printer output signals best represents the modified input signal;

a printer, responsive to said printer output signals reproduce the document in accordance therewith;

means for determining the difference between the determined printer output signal and the modified input signal, and generating at least one error signal responsive indicative thereof;

means for varying the reference signal as a function of the input signal and at least one previous printer output signal including:

first input based feedback means, producing a first signal dynamically varied as a function of the input signals which tends to produce a reference signal enhancing image edges;

second output based feedback means, producing a second signal varied in accordance with a number of neighboring printer output signals which have a same level, in order to cluster printer output signals for improved reproducibility, but tending to dampen edge response;

combining means for combining said first and second signals to generate a varying reference signal.

* * * * *